May 11, 1948. C. A. SEABRIGHT 2,441,447
CERAMIC PIGMENTS
Filed June 6, 1947
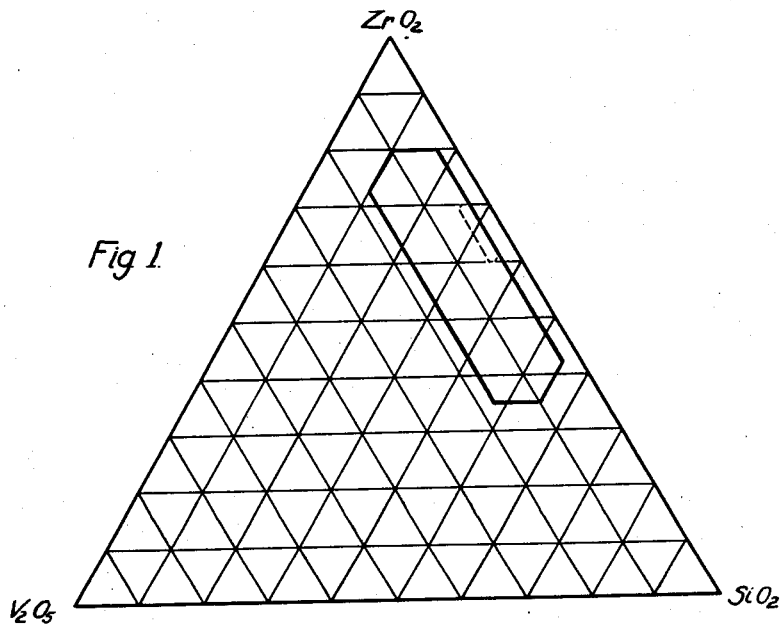
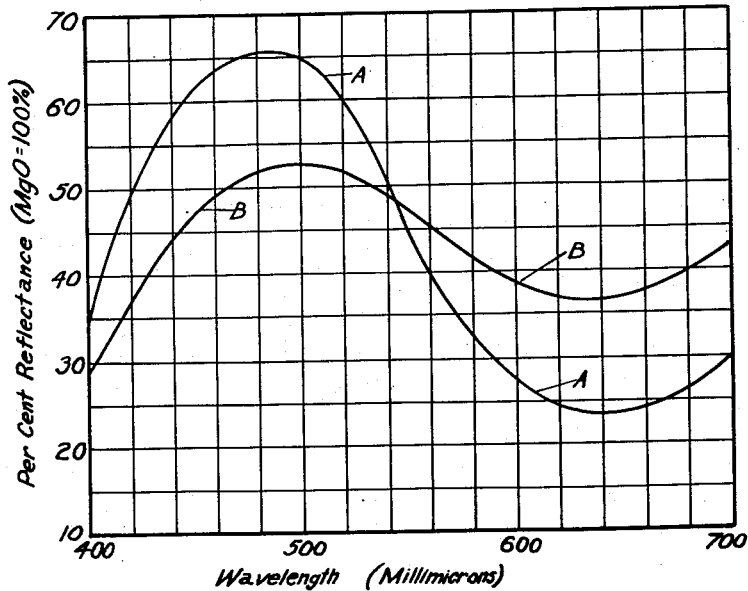
C.A.Seabright INVENTOR.
BY William H. O. Brown Patented May 11, 1948

2,441,447

UNITED STATES PATENT OFFICE 2,441,447

CERAMIC PIGMENTS

Clarence A. Seabright, Elyria, Ohio, assignor to The Harshaw Chemical Company, Elyria, Ohio, a corporation of Ohio Application June 6, 1947, Serial No. 753,033

13 Claims. (Cl. 106—299)

This invention relates to ceramic pigments and more especially to vanadium-zirconium pigments of pleasing blue and green colors suitable for a wide variety of uses in the ceramic field.

The novel pigments of the green variety may be produced by heating together suitable proportions of zirconium dioxide, silica and vanadium pentoxide or other compounds capable of yielding these oxides. The novel blue pigments may be produced in the same way by adding an alkali to the batch. It is preferable that a source of fluorine be added also although it is not absolutely essential.

If in the production of the blue pigments the proportions of zirconium dioxide and silica are those corresponding to zirconium silicate (ZrO$_2$.SiO$_2$)

the X-ray diffraction pattern of the resulting pigment is identical with that of zirconium silicate. In the case of the greens produced as above indicated there appear in the X-ray diffraction pattern lines corresponding to zirconium oxide, silica and zirconium silicate. Working from the premise that the blue might be produced from the same batch as the green if the conditions of calcination were right, I have attempted to complete the reaction of the green and thus produce the blue but this has not proved successful even at high temperatures. A number of attempts to produce these colors by calcining vanadium and finely divided zircon, with and without other materials present have also proved unsuccessful.

In the accompanying drawings, Fig. 1 is a triangular diagram indicating the range of proportions of zirconium dioxide, silica and vanadium pentoxide in the new pigments and Fig. 2 is a color diagram (a recording spectrophotometer chart) indicating the color characteristics of one example of the blue and one example of the green, the line A representing one example of a blue pigment on tile and the line B representing one example of a green pigment on tile.

The essential oxides may be brought together in the form of various batch mixtures, various compounds capable of yielding the essential oxides. For example, the vanadium may be added in the form of ammonium vanadate, sodium vanadate or vanadium pentoxide. The zirconium dioxide may be added as such or in the form of one of the commercially available zirconium oxide pigments such as Opax. Silica may be added as such or in the form of flint or other commercial silica of sufficient purity. The alkali may be added as the alkali fluoride, carbonate, hydroxide or oxide, or as above indicated, in the form of combinations with the other ingredients. Suitable alkalies are the indicated compounds of sodium, potassium and lithium. Zirconium silicate cannot be used because it does not decompose to yield the essential oxides under the conditions of calcination.

The alkalies are used in the formation of the novel blue pigments but not in the formation of the green pigments. Otherwise, the batches for the blues and greens may be the same.

In Fig. 1, I have indicated by the larger hexagonal figure proportions of zirconium oxide, silica and vanadium pentoxide suitable for production of the green pigments. The small hexagonal figure within the larger one, shown in dotted lines (Fig. 1) indicates the most favorable proportions for the formation of the green colors. It will be understood that in the formation of a batch suitable for the green, the source of the indicated oxides will not contain alkali and, of course, the oxides of zirconium and silicon will not be combined in any of the ingredients which are introduced into the batch. A proportion of zirconium silicate could, of course, be tolerated as an impurity and would have the expected effect of diluting the pigment. If any zirconium silicate is present, it should be neglected in calculating the proportions of other batch ingredients to be used. In calculating the batch compositions for the blue pigments, the proportions may be figured as for the greens and then the alkali may be added in the proportion from about ½% to 5% of the combined weights of the oxides of zirconium, silicon and vanadium. In this case, as indicated above, there is more freedom in the selection of ingredients since the alkalies may be added in combination with other ingredients.

The proportions shown in the larger hexagonal figure in Fig. 1 of the drawings, numerically stated approximate the following:

| | Parts by weight |
|---|---|
| ZrO$_2$ | 35 to 80 |
| SiO$_2$ | 55 to 10 |
| V$_2$O$_5$ | 3 to 17 |

These proportion limits yield useful pigments according to the invention, however, I prefer to employ a lesser amount of vanadium as a cost saving measure and prefer the stated constituents as proportions as follows:

| | Parts by weight |
|---|---|
| ZrO$_2$ | 39 to 80 |
| SiO$_2$ | 55 to 14 |
| V$_2$O$_5$ | 3 to 10 |

Optimum proportions are those shown in the dotted hexagonal figure in Fig. 1 and may be numerically stated as follows:

| | Parts by weight |
|---|---|
| $ZrO_2$ | 60 to 70 |
| $SiO_2$ | 26 to 36 |
| $V_2O_5$ | 3 to 5 |

The finished blues may follow any of the above stated proportions as to the zirconia, silica and $V_2O_5$ content and will contain additionally an alkali metal oxide of the class consisting of $Na_2O$, $K_2O$ and $Li_2O$, proportions being by weight based on the combined weight of $ZrO_2$, $SiO_2$ and $V_2O_5$ and amounting to from ½% to 5% in the case of $Na_2O$ and molecularly equivalent quantities for the others.

I am not certain of the state of combination, chemical or physical, of the constituent oxides in the final pigment. Accordingly, the pigments will be defined as containing certain constituent oxides without thereby intending to signify anything concerning the state of association of such oxides in the product. There is some evidence that in the case of the blues the zirconium oxide and silica react to form zirconium silicate but I do not know how the vanadium is associated therewith. It seems, however, to be extremely intimately combined physically or chemically. In the case of the greens, the reaction seems to go a lesser distance towards completion and to reach a stable condition. I have inferred that vanadium is in the penta-valent form in the final product but this may not be the case. Indeed, the blue color of vanadium, according to the literature, is to be expected to appear in the tetra-valent rather than in the penta-valent form. Whether the vanadium is somehow reduced to tetra-valent condition or forms a complex wherein the blue color appears in the penta-valent form I do not know. In any event, it is convenient to represent the pigments as containing the constituent oxides as indicated in Fig. 1 and it is to be understood that there is no intention to represent that the actual constitution of the final product has been determined. In those batch compositions which contain fluorine, the fluorine content probably is largely lost during the calcination so that only a minor proportion of the fluorine added to the batch remains in the final product.

In the case of the green compositions, the batch is mixed and calcined at a temperature of from 550° C. up to 1200° C. A preferable temperature range is from 700° C. to 900° C. The batch is placed in the kiln and brought up to the indicated temperature range and held there for the desired period of time which may be from 1 hour to 8 hours or more, for example, even up to 24 hours but heating beyond 8 hours seemingly results in no improvement. It is preferable to calcine from 2 to 6 hours in the indicated temperature ranges. The kiln atmosphere may be neutral or oxidizing but should not be strongly reducing.

In the case of the blue pigments, the conditions may be as indicated for the greens with the exception that if the alkali employed is potassium, the temperature of calcination should be at least 750° C. and may be carried up to 1300° C. if desired. The low temperatures required for forming these colors constitute a surprising feature of the process since normally colors of this general type are fired well above the lower limits of the ranges indicated above.

These colors, ranging from blue to bluish green (the blues from blue to greenish blue), are especially suitable for underglaze and body stains and are also suitable for use as engobes, glaze and overglaze stains and glass enamel colors. They give quite pleasing results in porcelain enamels but the percentage of pigment required in the case of porcelain enamels would increase the cost and tend to discourage their use in the low priced field.

The following table containing specific examples from actual practice will serve to illustrate the invention:

*Examples*

| | I | II | III | IV | V | VI | VII |
|---|---|---|---|---|---|---|---|
| $NH_4VO_3$ | 10 | 10 | 10 | 10 | | 10 | 10. |
| $ZrO_2$ | 125 | 125 | 125 | 125 | 125 | 125 | |
| $SiO_2$ | 60 | 60 | 60 | 60 | 60 | 60 | 60. |
| NaF | 5 | | | | 5 | | 5. |
| LiF | | | | | | | |
| KF | | 5 | | | | | |
| $V_2O_5$ | | | 6 | | | | |
| $ZrF_4$ | | | | 9 | | | |
| $Na_2CO_3$ | | | | | | 4 | 170. |
| Firing Temp | 750° C | 750° C | 950° C | 750° C | 750° C | 750° C | 750° C. |
| Firing Time | 4 hrs | 4 hrs | 4 hrs | 4 hrs | 4 hrs | 4 hrs | 4 hrs. |
| Color | light blue | light blue | light blue | light green | light blue | light blue | light blue. |

In the claims, the expression "essentially consisting of oxides of zirconium, silicon and vanadium" and the expression "essentially consisting of oxides of zirconium, silicon and vanadium and of an alkali metal compound of the class consisting of oxides of sodium, lithium and potassium" denote an analysis in terms of oxides of these elements, indicating a composition wherein such oxides are the components; but such expressions do not signify that in such compositions such oxides are present in the free state, nor do they signify anything concerning the state of association of such oxides in the compositions defined.

This application is a continuation-in-part of my copending application Serial No. 647,962 (now abandoned), filed February 15, 1946.

Having thus described my invention, what I claim is:

1. Ceramic pigment compositions essentially consisting of oxides of zirconium, silicon and vanadium and having colors within the range from blue to bluish green, said oxides being present in approximately the proportion ranges as follows: $ZrO_2$ from 35 to 80 parts by weight, $SiO_2$ from 55 to 10 parts by weight and $V_2O_5$ from 3 to 17 parts by weight.

2. Ceramic pigment compositions essentially consisting of oxides of zirconium, silicon and vanadium, and having colors within the range from blue to bluish green, said oxides being present in proportion ranges approximately as follows: $ZrO_2$ 39 to 80 parts by weight, $SiO_2$ from 14 to 55 parts by weight, $V_2O_5$ from 3 to 10 parts by weight.

3. Ceramic pigment compositions essentially consisting of oxides of zirconium, silicon and vanadium, and having colors within the range from blue to bluish green, said oxides being present in proportion ranges approximately as follows: $ZrO_2$ 60 to 70 parts by weight, $SiO_2$ 26 to 36 parts by weight, $V_2O_5$ from 3 to 5 parts by weight.

4. Ceramic pigment compositions essentially consisting of oxides of zirconium silicon and vanadium and having colors within the range from blue to bluish green, said oxides being present in approximately the proportion ranges as follows: $ZrO_2$ from 35 to 80 parts by weight, $SiO_2$ from 55 to 10 parts by weight and $V_2O_5$ from 3 to 17 parts by weight, said compositions also containing an alkali metal oxide of the class consisting of $Na_2O$, $K_2O$ and $Li_2O$, the same being present in proportion molecularly equivalent to from ½% to 5% by weight of $Na_2O$ based upon the combined weights of oxides of zirconium, silicon and vanadium.

5. Ceramic pigment compositions essentially consisting of oxides of zirconium, silicon and vanadium and of an alkali metal compound of the class consisting of oxides of sodium, lithium and potassium, having colors in the range from blue to greenish blue, said oxides being present in proportion ranges approximately as follows: $ZrO_2$ 39 to 80 parts by weight, $SiO_2$ from 14 to 55 parts by weight, $V_2O_5$ from 3 to 10 parts by weight, and said alkali metal compound being present in proportion molecularly equivalent to from ½% to 5% by weight of $Na_2O$ based upon the combined weights of the oxides of zirconium, silicon and vanadium.

6. Ceramic pigment compositions essentially consisting of oxides of zirconium, silicon and vanadium and of an alkali metal compound of the class consisting of oxides of sodium, lithium and potassium, having colors in the range from blue to greenish blue, said oxides being present in proportion ranges approximately as follows: $ZrO_2$ 60 to 70 parts by weight, $SiO_2$ from 26 to 36 parts by weight, $V_2O_5$ from 3 to 5 parts by weight, and said alkali metal compound being present in proportion molecularly equivalent to from ½% to 5% by weight of $Na_2O$ based upon the combined weights of the oxides of zirconium, silicon and vanadium.

7. Process for making ceramic pigments comprising calcining a mixture of compounds of zirconium, silicon and vanadium essentially consisting of compounds of said elements capable of yielding $ZrO_2$ from 35 to 80 parts by weight, $SiO_2$ from 55 to 10 parts by weight and $V_2O_5$ from 3 to 17 parts by weight, calcination being in a temperature range from 550° C. to 1200° C. for at least one hour.

8. Process for making ceramic pigments comprising calcining a mixture of compounds of zirconium, silicon and vanadium essentially consisting of compounds of said elements capable of yielding $ZrO_2$, $SiO_2$ and $V_2O_5$ in proportions as follows: $ZrO_2$ 39 to 80 parts by weight, $SiO_2$ from 14 to 55 parts by weight, $V_2O_5$ from 3 to 10 parts by weight, calcination being in a temperature range from 550° C. to 1200° C. for at least one hour.

9. Process for making ceramic pigments comprising calcining a mixture of compounds of zirconium, silicon and vanadium essentially consisting of compounds of said elements capable of yielding $ZrO_2$, $SiO_2$ and $V_2O_5$ in proportions as follows: $ZrO_2$ 60 to 70 parts by weight, $SiO_2$ from 26 to 36 parts by weight, $V_2O_5$ from 3 to 5 parts by weight, calcination being in a temperature range from 550° C. to 1200° C. for at least one hour.

10. Process for making ceramic pigments comprising calcining a mixture of compounds of zirconium, silicon and vanadium essentially consisting of compounds of said elements capable of yielding $ZrO_2$, $SiO_2$ and $V_2O_5$ in proportions as follows: $ZrO_2$ 35 to 80 parts by weight, $SiO_2$ 10 to 55 parts by weight, $V_2O_5$ 3 to 17 parts by weight, calcination being in a temperature range from 700° C. to 900° C. for at least one hour.

11. Process for making ceramic pigments comprising calcining a mixture of compounds of zirconium, silicon and vanadium essentially consisting of compounds of said elements capable of yielding $ZrO_2$, $SiO_2$ and $V_2O_5$ in proportions as follows: $ZrO_2$ 39 to 80 parts by weight, $SiO_2$ 14 to 55 parts by weight, $V_2O_5$ 3 to 5 parts by weight, calcination being in a temperature range from 700° C. to 900° C. for at least one hour.

12. Process for making ceramic pigments comprising calcining a mixture of compounds of zirconium, silicon and vanadium essentially consisting of compounds of said elements capable of yielding $ZrO_2$, $SiO_2$ and $V_2O_5$ in proportions as follows: $ZrO_2$ 39 to 80 parts by weight $SiO_2$ 14 to 55 parts by weight, $V_2O_5$ 3 to 10 parts by weight, the batch also containing an alkali metal compound of the class consisting of sodium, lithium, and potassium oxides, hydroxides, carbonates and fluorides in proportion molecularly equivalent to from ½% to 5% by weight of $Na_2O$ based upon the combined weights of $ZrO_2$, $SiO_2$ and $V_2O_5$, calcination being carried out in a temperature range from 550° C. to 1200° C. in the case where the alkali is sodium and in the case where the alkali is lithium and in a temperature range from 750° C. to 1300° C. in the case where the alkali is potassium.

13. Process for making ceramic pigments comprising calcining a mixture of compounds of zirconium, silicon and vanadium essentially consisting of compounds of said elements capable of yielding $ZrO_2$, $SiO_2$ and $V_2O_5$ in proportions as follows: $ZrO_2$ 60 to 70 parts by weight, $SiO_2$ 26 to 36 parts by weight, $V_2O_5$ 3 to 5 parts by weight, the batch also containing an alkali metal compound of the class consisting of sodium, lithium, and potassium oxides, hydroxides, carbonates and fluorides in proportion molecularly equivalent to from ½% to 5% by weight of $Na_2O$ based upon the combined weights of $ZrO_2$, $SiO_2$ and $V_2O_5$, calcination being carried out in a temperature range from 700° C. to 900° C. in the case where the alkali is sodium and in the case where the alkali is lithium and in a temperature range from 750° C. to 1300° C. in the case where the alkali is potassium.

CLARENCE A. SEABRIGHT.

REFERENCES CITED

The following references are of record in the file of this patent:

UNITED STATES PATENTS

| Number | Name | Date |
|---|---|---|
| 2,068,294 | Korinth | Jan. 19, 1937 |

FOREIGN PATENTS

| Number | Country | Date |
|---|---|---|
| 384,473 | Great Britain | Dec. 8, 1932 |
| 379,572 | Great Britain | Sept. 1, 1932 |